May 23, 1950 P. W. CORNELL 2,509,136
PROCESS AND APPARATUS FOR CONCENTRATING
DILUTE SOLUTIONS
Filed June 17, 1949
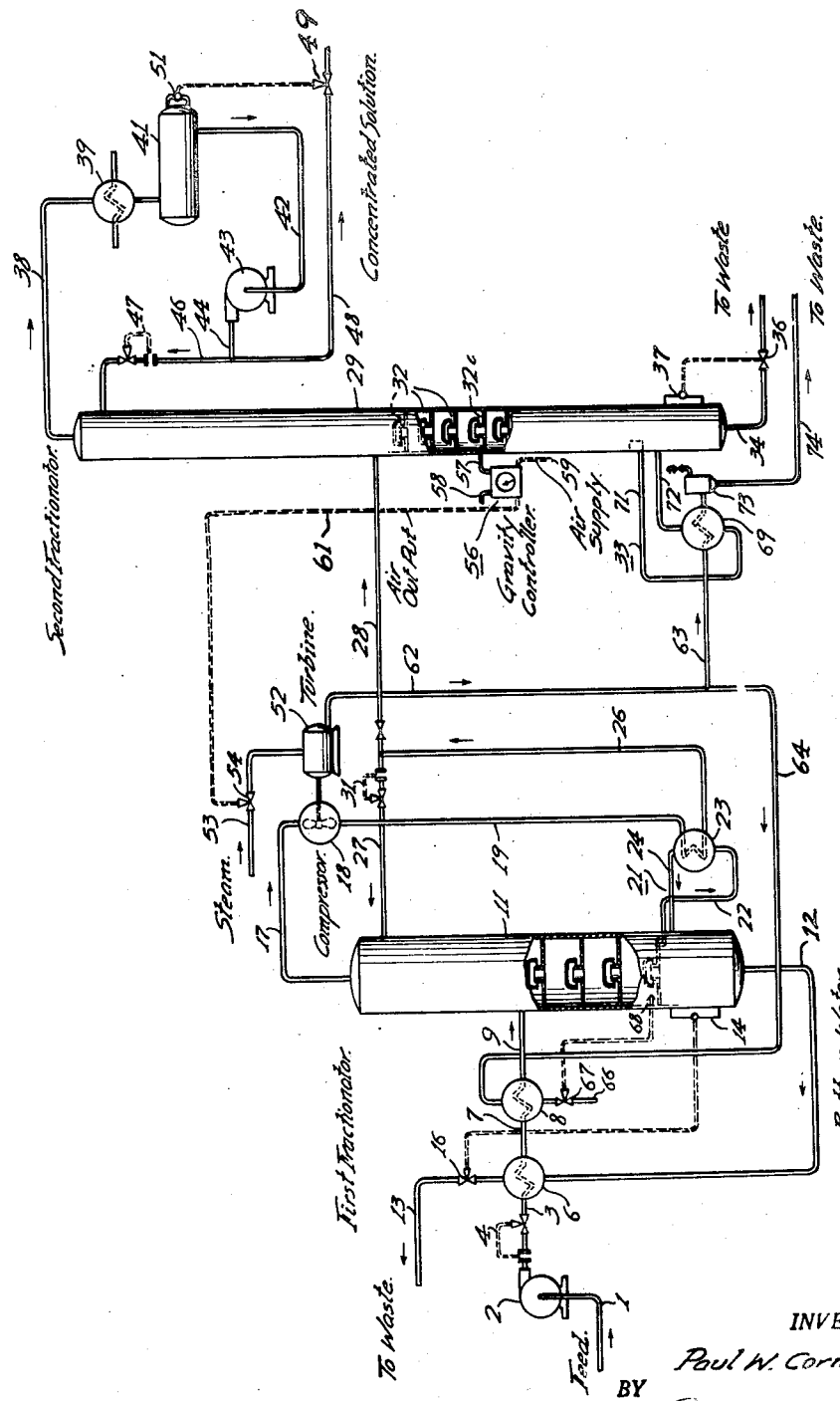
INVENTOR.
Paul W. Cornell.
BY
his ATTORNEY:-

Patented May 23, 1950

2,509,136

UNITED STATES PATENT OFFICE 2,509,136

PROCESS AND APPARATUS FOR CONCENTRATING DILUTE SOLUTIONS

Paul W. Cornell, Mount Lebanon, Pa., assignor to Gulf Oil Corporation, Pittsburgh, Pa., a corporation of Pennsylvania Application June 17, 1949, Serial No. 99,788

14 Claims. (Cl. 202—40)

1

This invention relates to a process and apparatus for concentrating dilute solutions, and more particularly to a process and apparatus for concentrating dilute aqueous solutions of vaporizable compounds, especially aqueous solutions such as are produced as by-products in the synthesis of hydrocarbons by the reaction between hydrogen and carbon monoxide.

The methods for the manufacture of hydrocarbons by the Fischer-Tropsch synthesis involving the reaction between hydrogen and carbon monoxide in the presence of a synthesis catalyst are characterized in that, together with the principal reactions resulting in the formation of hydrocarbons, side reactions involving the oxygen of the carbon monoxide also take place. These side reactions result in the formation of water and oxygenated compounds such as alcohols, ketones, aldehydes, etc. A hydrocarbon production method in order to be competitive with other means of obtaining hydrocarbons, should include a procedure for recovering the oxygenated compounds which in themselves are valuable materials that can be employed as solvents and as raw materials in the manufacture of a variety of chemical compounds.

The recovery of these oxygenated compounds, however, is difficult because the synthesis reactions produce a good deal more water than oxygenated compounds so that the compounds are obtained in the form of very dilute aqueous solutions; for example, solutions containing of the order of 5 to 15 per cent by weight of the compounds. Further, an effective recovery system should be capable of producing a concentrated solution of substantially uniform composition so long as the rate of introduction of charge remains constant. Also, it should preferably be capable of handling greater than optimum quantities of charge while still accomplishing effective concentration and, when the rate of introduction of charge is decreased, it should be capable of producing more concentrated solutions, thus simplifying later fractionation steps. So far as known, economical and efficient processes for handling these dilute solutions have not been proposed.

The present invention relates to a process and apparatus by which dilute solutions as described can be efficiently and economically concentrated under accurate and variable control. While the process and apparatus are adapted for use in the concentration of other dilute solutions, especially other dilute aqueous solutions containing volatile water-soluble organic compounds, they are particularly valuable when applied to concentrating the aqueous solutions produced in Fischer-Tropsch synthesis methods. Therefore, the following specific description will be primarily concerned with the concentration of such solutions.

In accordance with the invention, a dilute solution of water-soluble oxygenated organic compounds, such as is produced in the Fischer-Tropsch synthesis, is fractionated in a first fractionation zone under conditions of temperature, pressure and number of theoretical plates to produce a vapor overhead fraction rich in oxygenated compounds but still containing a substantial amount of water and a bottoms fraction consisting essentially of water (i. e. containing an insufficient amount of oxygenated compounds to make their recovery economically feasible). The vapor overhead fraction is then compressed to raise the pressure on the vapors, and the compressed vapors are passed in indirect heat exchange relationship with the solution in the first fractionation zone under conditions whereby the compressed vapors are liquefied and their heat of vaporization is supplied to the first fractionation zone. One part of the resulting liquefied overhead is returned to the first fractionation zone as reflux and another part is introduced into a second fractionation zone. In this second zone, the relatively concentrated solution of oxygenated compounds from the first fractionation zone is fractionated under conditions adapted to produce, as overhead, vapors of the desired final composition. These vapors are condensed to form a highly concentrated solution of the oxygenated organic compounds, part of which is used as reflux to the second fractionation zone and the remainder removed as product.

A feature of the invention is based upon the discovery that the control of the entire process, the operation of the first fractionation zone and of the second fractionation zone, can be accomplished by varying the extent of compression of the overhead vapors from the first fractionation zone in accordance with changes in the composition of the material undergoing fractionation at an intermediate point in the second fractionation zone. When the composition of the material at this point changes so as to comprise a greater quantity of the oxygenated compounds than is desired, the extent of compression is decreased. On the other hand, the extent of compression is increased when the material at this point becomes more dilute with respect to the oxygenated compounds.

In a preferred embodiment of the invention, the compression of the overhead vapors from the first fractionation zone is accomplished by means of a steam turbine connected with a suitable compressor. In this case, the rate of flow of steam to the turbine is controlled in accordance with changes in the composition of the material at an intermediate point in the second fractionation zone. This embodiment also comprises utilizing exhaust steam from the turbine for adding heat to the charge to the first fractionation zone and to solution in the second fractionation zone. As will be apparent from the following description, by using the exhaust steam in this way and also using bottoms from the first fractionation zone to add heat to the charge to that zone, substantially all of the heat energy required can be supplied by the steam entering the turbine and especially rapid and effective control of the process is accomplished.

In order that the invention may be understood more fully, reference should be had to the drawing which consists of a diagrammatic illustration of a preferred embodiment of the invention.

Referring to the drawing, the feed is introduced into the fractionation system through a line 1 leading to a feed pump 2 operated to supply the feed at the desired pressure and rate. The feed may consist of a typical aqueous solution produced in a Fischer-Tropsch synthesis operation containing, for example, 5 to 15 per cent by weight of the solution of oxygenated compounds such as, for example, ethanol, propanol, acetone, acetic acid, acetaldehyde, etc. The relative proportions of these compounds may be 55 to 60 per cent alcohols, 20 to 25 per cent acids, and approximately 10 per cent each of ketones and aldehydes, with ethanol, acetic acid, acetone and acetaldehyde predominating in the respective classifications. The feed may be supplied directly from the recovery system of the Fischer-Tropsch unit but ordinarily would be supplied from storage tanks or the like so as to make possible a relatively constant flow of feed to the fractionation system. The feed, after leaving the pump 2, flows through line 3 provided with an adjustable flow control valve 4 adapted to furnish the feed to the system at a constant rate. Heat is supplied to the feed in heat exchanger 6 wherein the feed is passed in indirect heat exchange relationship with the bottoms water from the first fractionator as will presently be described. The feed then flows through line 7, is again heated in indirect heat exchanger 8 by means of exhaust steam, and through line 9 into a first fractionator 11.

The first fractionator is designed to accomplish relatively rough fractionation of the solution and therefore need be provided with only a small number of plates. For example, this fractionator, when a solution containing 5 to 10 per cent of oxygenated compounds is charged, should fractionate the solution into a vapor overhead fraction containing most of the oxygenated compounds and comprising 10 to 15 per cent by weight of the feed and a bottoms fraction consisting, for all practical purposes, of water. The bottoms fraction is removed from the fractionator 11 through line 12 and is passed in indirect heat exchange relationship with the feed in heat exchanger 6, as previously mentioned, and is passed to waste through line 13. The removal of the bottoms fraction from the first fractionator is controlled by means of liquid level controller 14 which actuates a valve 16 in line 13.

The vapor overhead from the first fractionator is passed through line 17 and is compressed in compressor 18 in such manner as to supply energy to the vapors without causing condensation to the liquid phase and the compressed vapors are passed through line 19 leading to a condenser reboiler system indicated generally at 21. The rate at which the compressor is operated also determines the rate of withdrawal of vapors overhead from the first fractionator, thus controlling the operation of this fractionator. The reboiler system consists of a line 22 for removing solution from the bottom plate of the first fractionator, a heat exchanger-condenser 23, and a return line 24. In heat exchanger 23, the compressed vapors from line 19 transfer heat to the reboiler stream and are condensed to the liquid phase. Thus, the heat supplied to the reboiler stream includes the heat of vaporization of the overhead vapors from the fractionator. By this system of compressing the overhead vapors and heat exchanging the compressed vapors with the reboiler stream, it is possible to supply 6 to 14 B. t. u.'s to the reboiler stream when introducing about 1 B. t. u. of energy into the vapors in the compressor 18.

The liquefied vapors are passed from the heat exchanger 23 through line 26 and are divided into two streams, one passing through line 27 and acting as reflux, and the other passing through line 28 and constituting the feed to the second fractionator 29. Line 27 is provided with a flow controller and valve 31 so as to furnish reflux to the first fractionator at a substantially constant rate.

The second fractionator is provided with a relatively large number of plates 32 so as to separate the feed to this fractionator into a vapor overhead fraction which may consist of, for example, 75 to 90 per cent by weight of the feed to this fractionator and a bottoms fraction which, for all practical purposes will consist essentially of water. Heat is supplied to the second fractionator in a reboiler system indicated generally at 33. The bottoms water is removed from the system through a line 34 under control of a valve 36 actuated by a suitable liquid level controller 37. The vapor overhead is removed through line 38, condensed into liquid phase in condenser 39, and collected in reflux drum 41. The liquid is removed from the reflux drum through a line 42 by means of pump 43 and flows into line 44. A part of this liquid is returned through line 46 to the second fractionator as reflux. The flow of the liquid in line 46 is controlled by flow controller and valve 47. The remainder of this liquid is removed from the system through line 48 at a rate controlled by valve 49 actuated by liquid level controller 51. This liquid consists of a highly concentrated solution of the oxygenated compounds and while useful for certain purposes without further treatment, will ordinarily be additionally separated into its several components.

As previously stated, an important feature of the invention comprises the control of the entire process by varying the extent of compression of the overhead vapors in the first fractionation zone in accordance with changes in the composition of the material undergoing fractionation at an intermediate point in the second fractionation zone; also, a preferred embodiment of the invention involves the use of a steam turbine for actuating the compressor and the use of the exhaust steam from this turbine for supplying heat to the two fractionation zones. These results are accomplished in the embodiment shown in the drawing. Thus, a steam turbine 52 is shown for actuating compressor 18. Steam is supplied to this turbine through line 53 at a rate controlled by control valve 54. This valve is actuated in response to changes in the composition of the solution at an intermediate point in the second fractionator.

As shown, this actuation is accomplished by means of a specific gravity recorder-controller, indicated generally at 56, which may be of any suitable design. Specific gravity recorders adapted for use as controllers are well known and form no part of the present invention. They are disclosed in standard text books such as "Industrial Instruments for Measurement and Control" by Thomas J. Rhodes, McGraw-Hill Book Company, Inc., New York, 1941, Chapter X. The recorder-controller diagrammatically illustrated in the drawing, comprises a sample draw-off line 57 to continuously remove samples of the liquid on an intermediate tray 32a of second fractionator 29, and a sample discard line 58. The controller is provided with means not shown for continuously measuring the specific gravity of the sample and means for using the changes in the specific gravity for varying the rate of air output from the control head within the instrument. Compressed air supply line is indicated by dotted lines 59 and the air output line by dotted lines 61, the pressure on the air in this line being varied in accordance with changes in the action of the control head as established by changes in the control head.

This system comprising the valve 54 and the gravity recorder-controller 56 is so arranged that when the concentration of chemicals in the solution on plate 32a becomes greater than the concentration desired for effective operation of the system, which increased concentration is indicated by a decrease in the specific gravity of the tray liquid, the gravity controller actuates the valve 54 to decrease the amount of steam supplied to the turbine 52 which in turn slows down the compressor 18 and reduces the amount of feed to the second fractionator. It will be understood that when the concentration of the oxygenated compounds in the tray liquid increases above the desired concentration, this means that an undesirably large amount of oxygenated compounds is appearing in the second fractionator bottoms. On the other hand, when the concentration of the oxygenated compounds in the tray liquid has become too low resulting in an increased specific gravity of the liquid and indicating that too much water is being passed overhead, the gravity controller actuates the valve 54 to increase the amount of steam supplied to the turbine 52. Thus, the compressor 18 is speeded up and the rate of feed to the second fractionator through line 28 is increased. It will be understood that instead of the gravity recorder-controller, any other instrument capable of recording changes in the composition of the tray liquid may be employed.

It will be seen from the foregoing description that the second fractionator is operated to provide the desired separation between water and oxygenated compounds, while the first fractionator is automatically controlled to provide the maximum quantity of the desired oxygenated chemicals which the second fractionator is capable of concentrating.

The exhaust steam from the turbine 52 is passed through a line 62 and is divided into two streams, one passing through line 63 and the other through line 64. The steam flowing in line 64 is passed in indirect heat exchange relationship with the feed to the first fractionator in heat exchanger 8. This heat exchanger is operated so as to condense the exhaust steam which is removed from the system as water through line 66. The removal of water through line 66 and therefore the rate of introduction of steam into heat exchanger 8 is controlled by means of valve 67 actuated by means of a suitable thermocouple, indicated generally at 68, in accordance with changes in temperature occurring in the first fractionator 11. The steam flowing in line 63 is passed in indirect heat exchange relationship in heat exchanger 69 with a reboiler stream from the second fractionator. This stream is removed through line 71 and returned to the fractionator through line 72. The heat exchange is accomplished in heat exchanger 69 so as to condense the exhaust steam to water, and to insure this a trap 73 is provided. This trap is effective to cause adjustment of the operation of the system because as a higher temperature increase is required across the reboiler, the back pressure on the turbine will increase, which will decrease its output, which results in a reduction in the rate of feed to the second fractionator. The water is removed from the trap to waste through line 74.

It will be understood that the system disclosed in the drawing can be modified in certain respects while still achieving the advantages of the invention. For example, it may be found desirable in some cases to supply extraneous steam at a constant rate to the reboiler system 33. This will result in a greater amount of heat being supplied to the second fractionator but will not alter the fact that the amount of heat is varied in accordance with changes in the supply of steam to the turbine 52.

While it is believed that the important characteristics and advantages of the process illustrated by the drawing are more or less obvious from the foregoing description, they are brought out with particular clarity if specific situations are considered. As stated previously, in the case where the concentration of oxygenated compounds in the liquid on tray 32a becomes higher than desired, the gravity controller 56 actuates valve 54 to reduce the supply of steam to turbine 52. This slows down compressor 18, reduces the rate of flow of vapors in lines 17 and 19 and ultimately the rate of feed to the second fractionator through line 28. While this alone would correct the action of the second fractionator, this correction is speeded up because adjusting the supply of steam to turbine 52 to achieve a selected reduction in the extent of compression in compressor 18 does not cause a proportional decrease in the amount of exhaust steam available for heat exchange since a controlled amount of the compressed vapors are ultimately returned to the first fractionator as reflux. In addition, the steam required for, say, 95 per cent of full-load operation of the steam turbine is greater than 95 per cent of the steam required for full-load operation. Accordingly, when the rate of operation of the turbine is reduced, resulting in the supply of less feed to the second fractionator, a relatively greater amount of steam is available for supply to the reboiler system 33 of the second fractionator. By the double effect of the reduction in feed rate and the increase in the heat supplied per unit volume of feed, the action of the second fractionator is quickly corrected so that there are obtained from this fractionator the desired overhead fraction and bottoms fraction.

In this connection it will be noted that the amount of the exhaust steam flowing through line 64 is controlled, through thermocouple 68 and valve 67, in relation to the temperature in the first fractionator and therefore this amount remains substantially constant. As a result the effect of changes in the amount of exhaust steam is felt principally in the reboiler system of the second fractionator.

In the case under consideration, if the rate of introduction of feed to the first fractionator remains constant, which will usually be true, the total volume of the overhead and bottoms fractions from the second fractionator will be reduced. Therefore, the rate of withdrawal of bottoms from the first fractionator, which is controlled by liquid level controller 14 actuating valve 16, will be increased proportionally to the reduction in feed to the second fractionator. Since the fractionation effected in the first fractionator is intended only to be a relatively rough separation, this increase in the rate of withdrawal of bottoms does not change the effectiveness of the process in any important respect.

In the opposite situation where the gravity recorder-controller 56 indicates that the liquid on tray 32a is too dilute with respect to oxygenated compounds, which means that too much water is being withdrawn overhead, the gravity controller actuates the valve 54 to increase the steam to the turbine 52, which results in an increase in the feed to the second fractionator. The steam to the second fractionator reboiler and to heat exchanger 8 will increase, but not as rapidly as the feed rate to the second fractionator. This causes a lower percentage of the second fractionator feed to pass out overhead; thus the water previously going overhead is removed as bottoms product.

The system disclosed in the drawing operates efficiently when the feed rate is increased within reasonable limits. Depending upon the ultimate product desired, the increase in the feed can pass from the system either as bottoms from the first fractionator, in which case the product can be substantially the same as that obtained at a lower feed rate to the system, or the feed rate to the second fractionator can be increased, in which case the increased feed rate to the system will result in an increase in the rate of withdrawal of both overhead and bottoms from the second fractionator. In the latter situation the product obtained is of somewhat different composition than that obtained when operating the system at a lower feed rate.

In the description of the invention and in the appended claims, expressions such as "compressing the vapors" and "extent of compression" are used in regard to the operation of a compressor such as compressor 18 shown in the drawing. Since ordinarily the actual pressure on the vapors will not be raised an amount sufficient to cause a change in the selected pressure at which the fractionation system is operated, the expressions will be understood to indicate an increase in energy of the vapors supplied by the compressor, which increase in energy is largely expended in the increased rate of flow of the vapors to the heat exchanger 23 of the first fractionator reboiler system 21, which of course results in an increase in the supply of heat to this fractionator as well as affecting the rate of feed to the second fractionator.

It will be understood by those skilled in the art that although the present invention is particularly useful for the concentration of dilute aqueous solutions of water-soluble vaporizable compounds, particularly the aqueous solutions produced in Fischer-Tropsch synthesis methods, the invention is applicable to the concentration of dilute solutions of vaporizable organic compounds in which the solvent is a normally liquid organic compound having a boiling point above the boiling point of the dissolved compounds.

Obviously many modifications and variations of the invention, as hereinbefore set forth, may be made without departing from the spirit and scope thereof, and therefore only such limitations should be imposed as indicated in the appended claims.

I claim:

1. A process of recovering volatile organic compounds from dilute solution in a solvent having a boiling point above the boiling points of said compounds which comprises fractionating said dilute solution in a first fractionation zone into a vapor overhead fraction containing solvent and rich in said volatile organic compounds and a bottoms fraction consisting essentially of said solvent, compressing said vapor overhead fraction, passing the resulting compressed vapors into indirect heat exchange relationship with solution of said first fractionation zone under conditions to supply heat of vaporization of said compressed vapors to said last-mentioned solution and to condense said compressed vapors to the liquid phase, fractionating the resulting liquid phase material in a second fractionation zone into an overhead fraction consisting principally of said volatile organic compounds and a bottoms fraction consisting essentially of said solvent, and varying the extent of compression of the vapor overhead fraction from said first fractionation zone in accordance with changes in the composition of liquid phase material existing at an intermediate point in said second fractionation zone.

2. A process in accordance with claim 1 in which said dilute solution is a dilute aqueous solution of volatile water-soluble organic compounds boiling below the boilinng point of water.

3. A process of recovering volatile water-soluble organic compounds boiling below the boiling point of water from dilute aqueous solution which comprises fractionating said dilute aqueous solution in a first fractionating zone into a vapor overhead fraction containing water and rich in water-soluble organic compounds and a bottoms fraction consisting essentially of water, compressing said vapor overhead fraction, passing the resulting compressed vapors into indirect heat exchange relationship with a reboiler stream from said first fractionation zone under conditions to supply heat of vaporization of said compressed vapors to said reboiler stream and to condense said vapors to the liquid phase, returning a part of the resulting liquid phase material to said first fractionation zone as reflux, fractionating another part of said resulting liquid phase material in a second fractionation zone into an overhead fraction consisting principally of said water-soluble organic compounds and a bottoms fraction consisting essentially of water, and varying the extent of compression of the vapor overhead fraction from said first fractionation zone inversely in relation to changes in the concentration of water-soluble organic compounds in the liquid phase material at an intermediate point in said second fractionation zone.

4. A process of recovering volatile water-soluble organic compounds boiling below the boiling point of water from dilute aqueous solution which comprises fractionating said dilute aqueous solution in a first fractionating zone into a vapor overhead fraction containing water and rich in water-soluble organic compounds and a bottoms fraction consisting essentially of water, compressing said vapor overhead fraction by the action of flowing steam, passing the resulting compressed vapors into indirect heat exchange relationship with a reboiler stream from said first fractionation zone under conditions to supply heat of vaporization of said compressed vapors to said reboiler stream and to condense said vapors to the liquid phase, returning a part of the resulting liquid phase material to said first fractionation zone as reflux, fractionating another part of said resulting liquid phase material in a second fractionation zone into an overhead fraction consisting principally of said water-soluble organic compounds and a bottoms fraction consisting essentially of water, and varying the extent of compression of the vapor overhead fraction from said first fractionation zone by changing the rate of flow of said steam acting to compress said vapor overhead fraction inversely in relation to changes in the concentration of water-soluble organic compounds in the liquid phase material at an intermediate point in said second fractionation zone.

5. A process of recovering volatile water-soluble organic compounds boiling below the boiling point of water from dilute aqueous solution which comprises fractionating said dilute aqueous solution in a first fractionating zone into a vapor overhead fraction containing water and rich in water-soluble organic compounds and a bottoms fraction consisting essentially of water, compressing said vapor overhead fraction by the action of flowing steam, passing the resulting compressed vapors into indirect heat exchange relationship with a reboiler stream from said first fractionation zone under conditions to supply heat of vaporization of said compressed vapors to said reboiler stream and to condense said vapors to the liquid phase, returning a part of the resulting liquid phase material to said first fractionation zone as reflux, fractionating another part of said resulting liquid phase material in a second fractionation zone into an overhead fraction consisting principally of said water-soluble organic compounds and a bottoms fraction consisting essentially of water, passing flowing steam, after said steam has acted to compress said vapor overhead fraction, into indirect heat exchange relationship with liquid phase material of said second fractionation zone to supply heat to said second fractionation zone, and varying the extent of compression of the vapor overhead fraction from said first fractionation zone by changing the rate of flow of said steam acting to compress said vapor overhead fraction inversely in relation to changes in the concentration of water-soluble organic compounds in the liquid phase material at an intermediate point in said second fractionation zone.

6. A process in accordance with claim 5 in which said flowing steam, after said steam has acted to compress said vapor overhead fraction, is passed into indirect heat exchange relationship with the feed to said first fractionator.

7. A process of recovering volatile water-soluble organic compounds boiling below the boiling point of water from dilute aqueous solution which comprises fractionating said dilute aqueous solution in a first fractionating zone into a vapor overhead fraction containing water and rich in water-soluble organic compounds and a bottoms fraction consisting essentially of water, compressing said vapor overhead fraction by the action of flowing steam, passing the resulting compressed vapors into indirect heat exchange relationship with a reboiler stream from said first fractionation zone under conditions to supply heat of vaporization of said compressed vapors to said reboiler stream and to condense said vapors to the liquid phase, returning a part of the resulting liquid phase material to said first fractionation zone as reflux, fractionating another part of said resulting liquid phase material in a second fractionation zone into an overhead fraction consisting principally of said water-soluble organic compounds and a bottoms fraction consisting essentially of water, varying the extent of compression of the vapor overhead fraction from said first fractionation zone by changing the rate of flow of said steam acting to compress said vapor overhead fraction inversely in relation to changes in the concentration of water-soluble organic compounds in the liquid phase material at an intermediate point in said second fractionation zone, said changes in the rate of flow of steam resulting in changes in the rate of feed of said resulting liquid phase material to said second fractionator, and removing bottoms from said first fractionator at a rate adjusted to compensate for changes in the rate of feed to said second fractionator.

8. A process in accordance with claim 3 in which said dilute aqueous solution is an aqueous solution obtained as a by-product in the synthesis of hydrocarbons by the catalytic reaction between hydrogen and carbon monoxide containing as solute oxygenated organic compounds formed in said reaction.

9. A process in accordance with claim 5 in which said dilute aqueous solution is an aqueous solution obtained as a by-product in the synthesis of hydrocarbons by the catalytic reaction between hydrogen and carbon monoxide containing as solute oxygenated organic compounds formed in said reaction.

10. Apparatus adapted for the concentration of dilute solutions comprising a first fractionator, a second fractionator, means for compressing a vapor overhead fraction of said first fractionator, indirect heat exchange means for causing heat exchange between liquid undergoing fractionation in said first fractionator and the resulting compressed overhead fraction, means for conducting a part of the compressed overhead fraction after passing through said indirect heat exchange means to the upper part of said first fractionator as reflux, means for conducting another part of the compressed overhead fraction to said second fractionator, indicating means at an intermediate point in said second fractionator adapted to indicate the composition of liquid at said intermediate point, and means operatively connected with said indicating means for controlling the operation of said compressing means in accordance with changes in the composition of said liquid at said intermediate point in said second fractionator.

11. Apparatus adapted for the concentration of dilute solutions comprising a first fractionator, a second fractionator, a compressor adapted to compress a vapor overhead fraction from said first fractionator, a stream turbine actuating said compressor, a steam conduit leading to said steam turbine, a flow control valve in said steam conduit, conduit means for conducting a vapor overhead fraction from said first fractionator to said compressor, a reboiler system for said first fractionator comprising an indirect heat exchanger, conduit means for conducting said vapor overhead fraction from said compressor to said indirect heat exchanger, conduit means between said indirect heat exchanger and said second fractionator, indicating means at an intermediate point in said second fractionator adapted to indicate changes in the composition of liquid at said intermediate point, and means operatively connected with said indicating means adapted to adjust said flow control valve in said steam conduit in accordance with changes in the composition of said liquid at said intermediate point in said second fractionator.

12. Apparatus adapted for the recovery of volatile water-soluble organic compounds boiling below the boiling point of water from dilute aqueous solution comprising a first fractionator, a second fractionator, a compressor adapted to compress a vapor overhead fraction from said first fractionator, a steam turbine actuating said compressor, a steam conduit leading to the inlet side of said steam turbine, a flow control valve in said steam conduit, conduit means for conducting a vapor overhead fraction from said first fractionator to said compressor, a reboiler system for said first fractionator comprising an indirect heat exchanger, conduit means for conducting said vapor overhead fraction from said compressor to said indirect heat exchanger whereby heat of said vapor overhead fraction after passing through said compressor is supplied to a reboiler stream of said first fractionator, conduit means between said indirect heat exchanger and said second fractionator adapted to conduct overhead fraction from said indirect heat exchanger to said second fractionator, a gravity recorder at an intermediate point in said second fractionator adapted to indicate changes in the specific gravity of liquid at said intermediate point, and means operatively connected with said gravity recorder adapted to adjust said flow control valve in said steam conduit in accordance with changes in the specific gravity of said liquid at said intermediate point in said second fractionator, said flow control valve acting to decrease the flow of steam in said steam conduit as the concentration of water soluble organic compounds in the liquid at said intermediate point increases and to increase the flow of steam in said steam conduit as the concentration of water-soluble organic compounds in said liquid decreases.

13. Apparatus in accordance with claim 12 also comprising a reboiler system for said second fractionator comprising an indirect heat exchanger, conduit means between the exhaust side of said steam turbine and said last-mentioned indirect heat exchanger, whereby heat of said exhaust steam is supplied to the reboiler stream of said second fractionator.

14. Apparatus in accordance with claim 13 also comprising an indirect heat exchanger in the feed conduit to said first fractionator, conduit means between the exhaust side of said steam turbine and said indirect heat exchanger in said feed conduit, whereby heat of said exhaust steam is supplied to the feed to said first fractionator.

PAUL W. CORNELL.

REFERENCES CITED

The following references are of record in the file of this patent:

UNITED STATES PATENTS

| Number | Name | Date |
|---|---|---|
| 1,822,455 | Ricard et al. | Sept. 18, 1931 |
| 1,965,225 | Erter | July 3, 1934 |
| 2,069,490 | Fenske | Feb. 2, 1937 |
| 2,090,691 | Mateer et al. | Aug. 24, 1937 |

FOREIGN PATENTS

| Number | Country | Date |
|---|---|---|
| 659,452 | Germany | May 4, 1938 |